United States Patent
Datta et al.

(10) Patent No.: US 7,247,679 B2
(45) Date of Patent: *Jul. 24, 2007

(54) HETERO PHASE POLYMER COMPOSITIONS

(75) Inventors: Sudhin Datta, Houston, TX (US); Narayanaswami Raja Dharmarajan, Houston, TX (US); Prasadarao Meka, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 28 days.

This patent is subject to a terminal disclaimer.

(21) Appl. No.: 10/688,091

(22) Filed: Oct. 17, 2003

(65) Prior Publication Data

US 2004/0132913 A1    Jul. 8, 2004

Related U.S. Application Data

(60) Provisional application No. 60/419,183, filed on Oct. 17, 2002.

(51) Int. Cl.
  *C08F 8/00*   (2006.01)
  *C08L 23/00*  (2006.01)
  *C08L 23/04*  (2006.01)

(52) U.S. Cl. ...................... 525/191; 525/240

(58) Field of Classification Search ............... 525/191, 525/240
  See application file for complete search history.

(56) References Cited

U.S. PATENT DOCUMENTS

| | | | |
|---|---|---|---|
| 5,011,891 A * | 4/1991 | Spenadel et al. ............ 525/211 |
| 5,959,030 A | 9/1999 | Berta ............................ 525/64 |
| 6,232,402 B1 | 5/2001 | Demeuse ..................... 525/191 |
| 6,245,856 B1 * | 6/2001 | Kaufman et al. ............ 525/240 |
| 6,288,171 B2 * | 9/2001 | Finerman et al. ............ 525/192 |
| 6,342,565 B1 * | 1/2002 | Cheng et al. ................ 525/191 |
| 6,639,020 B1 * | 10/2003 | Brant .......................... 525/240 |
| 6,642,316 B1 * | 11/2003 | Datta et al. .................. 525/240 |
| 6,750,284 B1 * | 6/2004 | Dharmarajan et al. ...... 524/515 |
| 6,867,260 B2 * | 3/2005 | Datta et al. .................. 525/191 |
| 6,916,882 B2 * | 7/2005 | Brant .......................... 525/191 |
| 2004/0132913 A1 * | 7/2004 | Datta et al. ............... 525/326.1 |
| 2005/0054781 A1 * | 3/2005 | Dharmarajan et al. ...... 525/240 |
| 2005/0107533 A1 * | 5/2005 | Schauder et al. ............ 525/178 |

FOREIGN PATENT DOCUMENTS

| | | |
|---|---|---|
| EP | 0 792 914 | 3/1997 |
| WO | WO 97/20888 | 12/1997 |
| WO | WO 00/01766 | 1/2000 |

* cited by examiner

*Primary Examiner*—Nathan M. Nutter

(57) ABSTRACT

Hetero phase polymer compositions are described. The compositions may have polypropylene component, a modifier component and a compatibilizer component. The modifier component may in some embodiments be an ethylene α-olefin copolymer with a density $\geq 0.905$ g/cm$^3$. In other embodiments the modifier component may be a blend of a copolymer with a density of $\geq 0.905$ g/cm$^3$, and an ethylene α-olefin copolymer of lower, more traditional density.

34 Claims, No Drawings

HETERO PHASE POLYMER COMPOSITIONS

RELATED APPLICATIONS

This application claims the benefit of U.S. Provisional Application No. 60/419,183, filed Oct. 17, 2002, the entire disclosure of which is hereby incorporated herein by reference.

FIELD

The invention relates to hetero phase compositions, such as thermoplastic olefin (TPO) compositions, for use, among other uses, in the manufacture of automotive components, and for use in articles made from such compositions.

BACKGROUND

Embodiments of our invention relate to hetero phase polymer compositions having three main polymeric components comprising a polypropylene component, a modifier component and a compatibilizer component. The compatibilizer component imparts a greater degree of compatibility between the polypropylene component and modifier component phases, yielding improved physical properties, notably impact strength. Non-polymeric components may also be present in the compositions.

The term hetero phase polymer compositions refers to the presence of at least two phases: a continuous or matrix phase and a discontinuous or disperse phase distributed within the matrix phase.

Hetero phase polymer compositions include compositions generally referred to as Thermoplastic Olefin (TPO) Compositions, which are blends of polypropylene, modifier and optionally non-polymeric components such as fillers and other compounding ingredients. TPOs are multiphase polymer blends where the polypropylene forms a continuous matrix phase and the modifier component, generally derived from an ethylene containing interpolymer, is the dispersed component. The polypropylene matrix imparts tensile strength and chemical resistance to the TPO, while the ethylene polymer imparts flexibility and impact resistance. Generally speaking, TPOs have a dispersed phase which is not, or only modestly, cross-linked.

Hetero phase polymer compositions also include compositions generally referred to as thermoplastic vulcanizates (TPVs), which are also blends of polypropylene, modifier and optionally non-polymeric components such as fillers and other compounding ingredients, with the exception that thermoplastic vulcanizates are multiphase polymer blends where the dispersed modifier component is cross-linked or "vulcanized" to provide a rubber-like resilience to the composition.

Traditionally, highly amorphous, very low density ethylene-propylene copolymers (EP) and ethylene-propylene-diene terpolymers (EPDM) have been used as the modifier component in hetero phase compositions, these EP or EPDMs generally have a high molecular weight expressed in Mooney units. Recently, other ethylene-alpha olefin copolymers have been used, especially very low density ethylene-butene, ethylene-hexene and ethylene-octene copolymers which generally have a lower molecular weight expressed in Melt Index units. The density of these latter polymers is generally less than 0.900 g/cm3, indicative of some residual crystallinity in the polymer. The major market for TPOs is in the manufacture of automotive parts, especially bumper fascia. Other applications include automotive interior components such as door skin, air bag cover, side pillars and the like. These parts are generally made using an injection molding processes. To increase efficiency and reduce costs it is necessary to decrease molding times and reduce wall thickness in the molds. To accomplish these goals, manufacturers have turned to high melt flow polypropylenes (Melt Flow Rate>35 g/10 min.). These high melt flow rate (MFR) resins are low in molecular weight and consequently difficult to toughen, resulting in products that have low impact strength.

U.S. Pat. No. 6,245,856 suggests hetero phase compositions of the TPO type containing a polypropylene component, modifier component and compatibilizer component. The polypropylene component is generally described as a polypropylene homopolymer having a relatively high MFR. This document refers to the possible use of polypropylene impact copolymers without restricting the nature and amount of the other components. The modifier component is described as an elastomer component which can be an ethylene alpha olefin copolymer or an ethylene alpha olefin diene terpolymer. The density of the modifier component is stated to range from 0.85 to 0.90 g/cm3.

There is a need therefore for TPO manufacturers to be able to broaden the scope of polymers available to manufacture end use items with a better balance between the performance of the hetero phase composition in its end use, the processability during conversion of the molten compositions into the end use article and the cost of providing those properties.

Other background references include U.S. Pat. No. 5,959,030 to Berta, U.S. Pat. No. 6,245,856 to Kaufman et al., U.S. Pat. No. 6,232,402 to Demeuse, WO 97/20888, and EP 0 792 914.

SUMMARY

We have discovered that by employing the compatibilizer component disclosed herein, it is possible to use modifier components of increased density and crystallinity, often being less resilient than materials which heretofore have not been considered suitable for impact modification of TPOs. The density of the modifier component overall may be raised in some embodiments to a level where it exceeds the density hitherto assumed to be desirable for impact modification, where totally amorphous impact modifiers were preferred.

In a first aspect of the invention there is provided a hetero phase polymeric composition, comprising:

a) a polypropylene component, present in said hetero phase polymer composition as a continuous phase, said polypropylene component having a melting point $Tm \geq 110°$ C.;

b) a modifier component, said modifier component being a dispersed phase in said hetero phase polymer composition, said modifier component comprising at least 10 percent by weight of the total modifier component being an ethylene α-olefin polymer having a density $\geq 0.905$ g/cm$^3$;

c) a compatibilizer component, present in said hetero phase polymer composition in a compatibilizing amount, said compatibilizer component having a $\Delta Hf < 45$ J/g, said compatibilizer component having propylene sequences co-crystallizable with the polypropylene component of a).

In another aspect of the invention there is provided a hetero phase polymer composition, comprising:
  a) a polypropylene (polypropylene component) having polypropylene crystallinity, due to the presence of one of isotactic or syndiotactic sequences in said polypropylene;
  b) an ethylene α-olefin polymer being substantially free from propylene crystallinity, having a density of $\geq 0.905$ g/cm$^3$; and
  c) polymer compatibilizer having propylene crystallinity substantially the same as that in a).

In a further aspect of our invention we describe a two phase polymer blend comprising:
  a) a polypropylene component (PPC) present as a continuous phase, the polypropylene component having a Tm>110° C. or a ΔHf>60 J/g, and wherein the polypropylene component has crystallinity from one of isotactic or syndiotactic sequences;
  b) a modifier component (MC), present in the polymer blend at $\leq 10$ weight percent, based on the total polymer weight of the blend, the modifier component having a density in the range of from 0.85–0.965 g/cm$^3$; and
  c) a polymer compatibilizer (CC), present in the blend at a compatibilizing amount, the compatibilizer component having a ΔHf<45 J/g, said compatibilizer component having propylene sequences that co-crystallize with the polypropylene component of a).

In a further aspect of our invention, a two phase polymer composition is provided, comprising:
  a) an impact copolymer of propylene (ICP), the ICP having one or more of Tm>140° C., ΔHf>95 J/g, or an α-olefin content of one of >2 or <25 weight percent, a molecular weight in the range of from 10,000–5,000,000, a melt flow rate in the range of from 15–60, the ICP present in the two phase polymer composition in the range of from 70–90 weight percent;
  b) an ethylene α-olefin copolymer, wherein the α-olefin is one or more of butene-1, hexene-1, or octene-1, the ethylene copolymer having a density $\geq 0.905$ g/cm$^3$, the ethylene copolymer may be a blend of two or more ethylene α-olefin copolymers, and if a blend, the aggregate density is $\geq 0.905$ g/cm$^3$, the ethylene α-olefin copolymer being present in the two phase polymer composition in the range of from 15–22 weight percent, having an melt index in the range of from 0.1–10 g/10 minutes;
  c) a compatibilizer component present in the two phase polymer composition in the range of 0.1–8 weight percent, the compatibilizer component is a polymer of propylene and one or more of ethylene, butene-1, hexene-1, or octene-1, the compatibilizer component has a crystallinity defined by one of Tm<100° C., or a ΔHf<25 J/g, wherein the compatibilizer component has a narrow compositional distribution, such that >75 wt. % of the compatibilizer component may be isolated in a thermal fractionation, in 2 adjacent soluble fractions, where each fraction differs <20% from the average weight present α-olefin of the total compatibilizer component.

In another aspect of our invention a hetero phase polymeric composition is contemplated, comprising:
  a) a polypropylene component present in the hetero phase polymer composition as a continuous phase, the PP having a melting point Tm$\geq$100° C.;
  b) a modifier component, the modifier component being a dispersed phase in the hetero phase polymer composition, said modifier component comprising at least 10% by weight of the total modifier component of a polymer derived from ethylene and an alpha-olefin having from 4 to 20 carbon atoms with a density of at least 0.88 g/cm$^3$ and crystallinity sufficient for determination of the CDBI with a CDBI of at least 50%;
  c) a compatibilizing amount of a compatibilizer component, derived to an extent of at least 50 mole % of propylene compatibilizer component and having a ΔHf<45 J/g which is co-crystallizable with the polypropylene component.

In another aspect, a two phase polymer composition is contemplated, comprising:
  a) an impact copolymer of propylene (ICP), said ICP having one or more of Tm>140° C., ΔHf>95 J/g, or an α-olefin content of one of >2 or <25 weight percent, a molecular weight in the range of from 10,000–5,000,000, a melt flow rate in the range of from 15–60 dg/min., the ICP present in said two phase polymer composition in the range of from 70–90 weight percent;
  b) an ethylene α-olefin copolymer, wherein the α-olefin is one or more of butene-1, hexene-1, or octene-1, said ethylene copolymer having a density $\geq 0.905$ g/cm$^3$, the ethylene copolymer may be a blend of two or more ethylene α-olefin copolymers, and if a blend, the aggregate density is $\geq 0.905$ g/cm$^3$, the ethylene α-olefin copolymer being present in said two phase polymer composition in the range of from 15–22 weight percent, having an melt index in the range of from 0.1–10 g/10 minutes;
  c) a compatibilizer component (CC) present in the two phase polymer composition in the range of 0.1–8 weight percent, the compatibilizer component is a polymer of propylene and one or more of ethylene, butene-1, hexene-1, or octene-1, the compatibilizer component has a crystallinity defined by one of Tm<100° C., or a ΔHf<25 J/g, wherein the compatibilizer component has a narrow compositional distribution, such that >75 wt. % of the compatibilizer component may be isolated in a thermal fractionation, in 2 adjacent soluble fractions, where each fraction differs <20% from the average weight present α-olefin of the total compatibilizer component.

The hetero phase polymer compositions of embodiments of our invention may be prepared by blending the polypropylene component with the modifier component and a compatibilizer component.

These and other features, aspects and advantages of embodiments of our invention will become better understood with reference to the following description, and appended claims.

DESCRIPTION

We contemplate hetero phase polymer compositions composed of a polypropylene component, a modifier component and a compatibilizer component.

The Modifier Component

The modifier component may be comprised of one or more ethylene-alpha olefin copolymers and have an aggregate density above 0.900 g/cm3, or in another embodiment $\geq 10$ weight percent of the modifier component may be an ethylene alpha-olefin polymer having a density above 0.900 g/cm3.

Alternatively, $\geq 10$ percent by weight of the total weight of the modifier component, is a copolymer with a density of ≧0.905 g/cm3 or ≧0.910 g/cm3 or ≧0.912 g/cm3. This polymer may form ≧20, or ≧30, or ≧40, or ≧50, or ≧60, or ≧70, or ≧80, or ≧90 of the total of the modifier component on a weight percent basis. Or this copolymer may constitute substantially the whole of the modifier component. If two or more ethylene α-olefin polymers are combined to form the modifier component, they may be the same or different in their selection of comonomers and/or the amount of comonomer or comonomer amounts and/or densities.

The added polymer (one differing in density and or amount or type of comonomer from the copolymer described above) may be one generally used conventionally as modifier in TPOs, and as such may be generally lower in density than the first polymer described above. The amounts of such added or second polymer depend on the balance of effects desired. Generally a lower density polymer may enhance properties such as impact strength, while a higher density polymer, owing to its higher crystallinity, may enhance stiffness and tensile strength in the TPO compound. This additional polymer or polymers may be present in the modifier component at ≦80, or ≦70, or ≦60, or ≦50, or ≦40, or ≦30, or ≦20, or ≦10 weight percent. Such polymers of lower density include, but are not limited to polymers of having a density of ≦0.900, or ≦0.895, or ≦0.890, or ≦0.885, and/or ≧0.860, or ≧0.865 g/cm3

The modifier component (either a single polymer or blends) may be present in the hetero phase polymer composition as a disperse phase, in a continuous phase of the polypropylene component. Thus, the amount of modifier component should not exceed that needed to maintain its dispersed condition in the polypropylene component continuous phase. When such an upper limit is reached, (the upper boundary of maintaining a dispersed condition) additional amounts of modifier component will tend to result in the modifier becoming a so-called "co-continuous phase" in which discrete, dispersed phase islands will coalesce into larger islands. This co-continuous state may be detrimental to physical properties, as the flexural modulus is lowered. To mitigate such effects, if larger amounts of modifier component are desired or required, a full or partial cross-linking can be effected. This full or partial cross-linking may decrease the tendency to co-continuity. Such cross-linking can be effected by chemical means (peroxide or sulfur or silane, azides, etc.) or by non-chemical means such as electron beam radiation.

The sizes of the individual domains of the dispersed phase are generally small, with the smallest length dimension for the dispersed phase being less than 10 μm. This phase size of the dispersed phase may be maintained during processing even without crosslinking. The disperse phase is comprised of a mixture of the modifier component with some amount of the polypropylene component, due to thermodynamic mixing of polymers. The balance of the polymers not in this disperse phase make up the continuous phase.

The one or more copolymers that make up the modifier component may be substantially free of propylene crystallinity, by which we intend <10 or <5 or <1 or 0 percent of propylene crystallinity is in the modifier component as determined by Differential Scanning Calorimetry (DSC).

The one or more ethylene α-olefin copolymers that make up the modifier component may include C3 to C20 alpha olefin derived units. Or the C4 to C10 alpha olefin derived units, for example, butene-1, hexene-1 or octene-1, and optionally the copolymers may contain diene derived units. Such combinations of ethylene and α-olefins as described above include, but are not limited to, copolymers such as ethylene-propylene; ethylene-butene-1; ethylene-hexene-1; ethylene-pentene-1; ethylene-4-methyl-1-pentene; ethylene-octene-1; ethylene-propylene-butene-1; ethylene-propylene-hexene-1; ethylene-propylene-pentene-1; ethylene-propylene-octene-1; and the like may be used as the polyethylene portion of the hetero phase polymer composition.

The one or more α-olefin derived units may be present in the ethylene copolymer in an amount of less than 30 mole percent based on the copolymer, or less than 25 mole percent, or less than 20 mole percent. If the optional diene is present, it may range from ≧0.5 to ≦10 weight percent, or from ≧0.5 to ≦7 weight percent (based on FTIR determination). The ethylene content of the copolymer may generally range from 60–100 weight percent, or at least 70 and/or 95 weight percent or less.

The copolymer generally may have a number average molecular weight, as determined by GPC, of from 30,000 to 500,000 or may be greater than 50,000 and/or less than 100,000. The Melt Index may be from 0.1 to 20 g/10 minutes.

The copolymer may have a CDBI of at least 50%, or at least 60% or even 65% and a weight average molecular weight distribution of from 1.5–4 or 1.7–3.5, or at least 1.8 and/or less than 3.0. This homogeneity and molecular weight and compositional distribution, as indicated by the CDBI, reflects a reduction in the presence of lower molecular weight, higher comonomer content impurities. Such polymer can be produced using metallocene based catalyst systems in gas phase or solution processes. The metallocene based catalysts used for such polymerizations are generally of the metallocene-alumoxane, metallocene-ionizing activator type. Useful catalysts are those disclosed in EP 129368, U.S. Pat. Nos. 5,026,798 and 5,198,401 each incorporated herein by reference.

The copolymer may or may not contain long chain branches, whose presence may be inferred from rheology-type measurements such as melt tension and the internal energy of activation for melt flow.

The modifier component may comprise polymers derived from cyclic mono-olefins such as styrene and both linear and cyclic dienes can also be used. For a discussion of such dienes, U.S. Pat. No. 6,245,846 is incorporated by reference.

The modifier component can be linear, substantially linear, blocky or branched. For a discussion of such options, U.S. Pat. No. 6,245,846 is incorporated by reference.

The Compatibilizer Component

The compatibilizer component may comprise an ethylene-propylene copolymer having a propylene derived content of greater than 50 weight percent. Optionally, ethylene can be replaced or added to such polymers with a C4–C20 or C4–C12 α-olefin, such as, for example, one or more of 1-butene, 4-methyl-1-pentene, 1-hexene or 1-octene or decene.

The propylene content may vary from 50 to 92 weight percent, or at least 70 weight percent and/or less than 90 weight percent, or at least 75 weight percent and/or less than 90 weight percent.

The compatibilizer component may be one of isotactic, atactic, syndiotactic or combinations thereof. The tacticity should be adapted to ensure compatibility, especially relative to the polypropylene component. In some embodiments of our invention, the tacticity of the polypropylene component and the compatibilizer component may be substantially the same, by substantially we intend that these two components have at least 80, or 90, or 95, or 100% of the same tacticity. Even if the components are of mixed tacticity (i.e.

partially isotactic and partially syndiotactic) the percentages in each should be at least 80% or greater the same as the other component.

The compatibilizer component may be co-crystallizable with the polypropylene component. The co-crystallizablility may be tested by comparing the DSC melting behavior before and after mixing samples of the polypropylene component and compatibilizer component. As co-crystallization occurs, both the melting point and glass transition temperature of the blend will begin to fall. The co-crystallization phenomenon can also be observed by studying the morphology at the interface of the modifier and the polypropylene component using Transmission Electron Microscopy (TEM). In a TEM view, in co-crystallized areas, either the compatibilizer component and/or the polypropylene component may appear as a single phase in the blend, or they may also appear as discrete phases with a high degree of interfacial and epitaxial crystallization between the polypropylene component and the compatibilizer component.

Both the polypropylene component and the compatibilizer component may have isotactic sequences. The type of crystallinity, or lack thereof (isotactic, syndiotactic, atactic, ethylene) may be determined by NMR. For the compatibilizer component the presence of isotactic sequences can be determined by NMR measurements showing two or more propylene derived units arranged isotactically. In the compatibilizer component, the isotactic sequences may be interrupted by units which are not isotactically arranged or by units that otherwise disturb the crystallinity derived from the isotactic sequences. The crystallinity of the compatibilizer component may be from 2–65% or 5–40% of an identically treated (any steps taken with one sample are taken identically with the comparison sample, for example, annealing, and/or stresses introduced during fabrication and/or measurement) isotactic polypropylene, as determined by DSC.

Thus, the compatibilizer component has a heat of fusion of less than 45 J/g. The crystallinity interruption may be predominantly controlled by the incorporation of monomer units other than propylene, such as ethylene. In one embodiment, the compatibilizer component may be a copolymer including from a lower limit of 5%, or 6%, or 8%, or 10% by weight to an upper limit of 20%, or 25%, or 30%, or 35%, or 40% by weight ethylene-derived units, and from a lower limit of 60% or 70% by weight to an upper limit of 95%, or 94%, or 92%, or 90% by weight propylene-derived units, the percentages by weight based on the total weight of propylene- and ethylene-derived units. The copolymer may optionally contain diene-derived units.

The compatibilizer component may include some or all of the following characteristics, where ranges from any recited upper limit to any recited lower limit are contemplated:

a) a melting point, generally a single melting point, ranging from an upper limit of less than 110° C., or less than 105° C. or less than 90° C., or less than 80° C., or less than 70° C., to a lower limit of greater than 25° C., or greater than 35° C., or greater than 40° C., or greater than 45° C.;

b) a heat of fusion ranging from a lower limit of greater than 1.0 joule per gram (J/g), or greater than 1.5 J/g, or greater than 4.0 J/g, or greater than 6.0 J/g, or greater than 7.0 J/g, to an upper limit of less than 45 J/g, or less than 40 J/g, or less than 35 J/g, or less than 30 J/g, or less than 25 J/g, or less than 20 J/g;

c) a molecular weight distribution (MWD) $M_w/M_n$ ranging from a lower limit of 1.5 or 1.8 to an upper limit of 40, or 20, or 10, or 5, or 3;

d) a number average molecular weight of from 10,000–5,000,000 or from 40,000–300,000 or from 80,000–200,000, as determined by gel permeation chromatography (GPC); or e) a Mooney viscosity ML (1+4)@125° C.<100 or <75.

In embodiments of our invention, at least 75% by weight, or at least 80% by weight, or at least 85% by weight, or at least 90% by weight, or at least 95% by weight, or at least 97% by weight, or at least 99% by weight of the compatibilizer component may be soluble in a single temperature fraction, or in two adjacent temperature fractions, with the balance of the copolymer in immediately preceding or succeeding temperature fractions. These percentages are fractions, for instance in hexane, beginning at 23° C. and the subsequent fractions are in approximately 8° C. increments above 23° C. Meeting such a fractionation requirement means that a polymer has statistically insignificant intermolecular differences in propylene tacticity.

Fractionations may be conducted in boiling pentane, hexane, heptane and even di-ethyl ether. In such boiling solvent fractionations, polymers making up compatibilizing components of embodiments of our invention may be totally soluble in each of the solvents, offering no analytical information. For this reason, we have chosen to do the fractionation as referred to above and as detailed herein, to find a point within these traditional fractionations to more fully describe our polymer and the surprising and unexpected insignificant intermolecular differences of tacticity of the polymerized propylene.

The compatibilizer component polymers are generally devoid of any substantial intermolecular heterogeneity in tacticity and comonomer composition. They are also substantially devoid of any substantial heterogeneity in intramolecular composition distribution. This is typical of metallocene catalyst produced polymers. Intramolecular heterogeneity is not intrinsic to metallocene polymers and can only be forced through composition sequencing during synthesis (e.g. series reactor).

The compatibilizer component has a crystalline portion and an amorphous portion, the amorphous portion being the result of one of stereo error introduced by a catalyst or by the amount and nature of a comonomer. The compatibilizer component is more fully discussed in U.S. published application US 2002/0004575 A1.

The Polypropylene Component

The polypropylene component may have MFRs ranging from 15–100, or >15, or >20, or >25, or >30, or <100, or <90, or <80, or <70, or <60 dg/min.

The polypropylene component, may be a polymer having primarily isotactic, syndiotactic, atactic or combinations of polypropylene crystallinity.

The polypropylene component may have melting temperature (Tm) of >100° C., or >110° C., or >115° C., or >120° C., or >125° C., or >130° C., or >130° C., as determined by ASTM D-3417.

The polypropylene component may have a heat of fusion (ΔHf)>60, or >70, or >80, or >85, or >90, or >95 J/g (as determined also by DSC). Generally speaking, the crystallinity is a major influence on the heat of fusion and melting temperature, and should be higher for the polypropylene component than that of the compatibilizer component.

The polypropylene component may have a number average molecular weight (Mn) in the range of from 10,000 to 5,000,000. And a melt flow rate (MFR) (determined by the ASTM D1238 technique, condition L) in the range of from 15 to 200 or >15 and/or <120 dg/min.

The polypropylene component may be a copolymer containing α-olefin derived units at generally <70, to >2, or <50, to >2, or <40, to >2, or <30, to >2, or <25 weight percent, based on the total weight of the polypropylene component. Exemplary α-olefins are those α-olefins with 4 to 12 carbon atoms and ethylene. For example, the α-olefin or α-olefins may be one or more of ethylene, butene-1, 4 methyl-1-pentene, hexene-1, octene-1.

In one embodiment, the polypropylene component has a melting point above 120° C. and is a random copolymer of propylene derived units and up to 10 mol % ethylene and/or butene-1.

The polypropylene component may be a continuous phase in the hetero phase polymer composition of embodiments of our invention. The polypropylene component and compatibilizer component discussed herein, may have substantially the same stereo regularity, selected from isotactic, syndiotactic, atactic or combinations thereof.

The polypropylene component used in the practice of the invention can be prepared using any known technology for the production of polypropylene. This includes the use of traditional Ziegler-Natta catalyst systems as well as metallocene catalyst systems.

Polypropylene Impact Copolymer (ICP)

In embodiments of our invention, when the polypropylene component is an impact copolymer, such ICPs are themselves two phase systems, however in the present hetero phase blends, each of the two individual phases of the ICP may generally blend with the respective phase of the blend, i.e. crystalline and/or amorphous.

As indicated, an ICP can be in the polypropylene component as part or all of the PPC, used in combinations with the other components of the hetero phase composition. The ICPs have melt flow rates (MFR) of the polypropylene homopolymer portion of the ICP (determined by the ASTM D1238 technique, condition L) in the range of from 15 to 200, or at least 15 and/or less than 120 dg/min. Exemplary alpha-olefins for the rubber portion of the ICP, may be selected from one or more of ethylene; and C4 to C20 alpha olefins such as butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

Suitably if ethylene is the α-olefin in the rubber phase of the ICP, it may be present in the range of from 25–70 weight percent, or at least 30 and/or less than 65 percent based on the weight of the rubber phase. The rubber phase may be present in the ICP in the range of from 4–20 weight percent, or at least 6 or 10 weight percent and/or less than 18 weight percent, all based on the total weight of the ICP. The MFR of the ICP may be in the range of from 15 to 60, or may be at least 20 and/or less than 50 or less than 40 dg/min. The ICP may be so-called reactor blends.

The ICP may also be a physical blend of polypropylene and one or more elastomeric polymers of the ethylene α-olefin type, generally ethylene propylene elastomeric polymers.

The ICP useful in embodiments of our invention may be prepared by conventional polymerization techniques such as a two-step gas phase process using Ziegler-Natta catalysis. For example, see U.S. Pat. No. 4,379,759 which is fully incorporated by reference. The ICPs of embodiments of our invention are preferably produced in reactors operated in series, and the second polymerization, may be carried out in the gas phase. The first polymerization, may be a liquid slurry or solution polymerization process.

Metallocene catalyst systems may be used to produce the ICP compositions useful in embodiments of our invention. Current particularly suitable metallocenes are those in the generic class of bridged, substituted bis(cyclopentadienyl) metallocenes, specifically bridged, substituted bis(indenyl) metallocenes known to produce high molecular weight, high melting, highly isotactic propylene polymers. Generally speaking, those of the generic class disclosed in U.S. Pat. No. 5,770,753 (fully incorporated herein by reference) should be suitable.

A description of semi-crystalline polypropylene polymers and reactor copolymers can be found in "Polypropylene handbook", E. P. Moore Editor, Carl Hanser Verlag, 1996.

The Hetero Phase Composition

The modifier component may be present in the hetero phase polymer composition at ≧5, or ≧9, or ≧10, or ≧15, weight percent and/or ≦30, or ≦25 weight percent, based on the total amounts of polymeric components in the hetero phase polymer composition.

The polypropylene component typically comprises ≧90 or ≦50 weight percent of the hetero phase composition or 60–90 weight percent, or 70–90 weight percent based on the total weight of the polymeric components.

The compatibilizer component may be present in the hetero phase polymer composition in a compatibilizing amount. Those of skill in the art will understand that this indicates an amount sufficient for the compatibilizer component not to form a separate phase and in any case less than the amount of modifier component. A compatibilizing effect is evident if the average size of the dispersed phase regions is reduced in comparison with the same proportion of polypropylene component and modifier component combined without compatibilizer. This can be assessed visually as in U.S. Pat. No. 6,245,856, incorporated herein by reference. Additionally, a compatibilizing amount can be determined as that amount that causes the impact strength, as determined by Gardner Impact at −29° C., to rise ≧15%, or ≧20%, or ≧25%, or ≧30% over/above a blend not containing such compatibilizer.

In other embodiments of our invention, the compatibilizer component may be present in the hetero phase polymer composition at ≧0.1, or ≧0.3, or ≧0.5, or ≧0.7, or ≧0.9, or ≧1, or ≦8, or ≦7, or ≦6, or ≦5 weight percent based on the total polymer weight in the hetero phase polymer composition.

A variety of additives may be incorporated into the ICP for various purposes. Such additives include, for example, stabilizers, antioxidants, fillers, colorants, nucleating agents and mold release agents. Primary and secondary antioxidants include, for example, hindered phenols, hindered amines, and phosphates. Nucleating agents include, for example, sodium benzoate and talc. Dispersing agents such as Acrowax C can also be included. Slip agents include, for example, oleamide and erucamide. Catalyst deactivators are also commonly used, for example, calcium stearate, hydrotalcite, and calcium oxide.

Parameter Measurement

The crystallinity of ethylene based modifier component is conveniently measured by Differential Scanning Calorimetry (DSC), and is related to the thermal history of the polymer. The modifier component may have a single or multiple crystalline melting points above 23° C. The temperature of these melting peaks depends on the ethylene content of the polymer, on the ethylene sequence and compositional distribution, and on the thermal history of the polymer. These melting peaks typically range from 30° C. up to 90° C. in polymers of very high ethylene content. When a polymer sample is melted (typically at 150° C. or above) and allowed to cool down, these crystalline melting peaks develop slowly with time. Therefore, their relative quantification requires rigorous sample preparation protocols. We prefer therefore characterizing the crystallinity of modifier component by their total crystallization enthalpy measured by DSC after sample annealing at 150° C. or above.

Measurements

Molecular Weight and Polydispersity Index

Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Measurement

Physical Property Measurements:

Tensile Strength at Yield and Elongation at Yield:

Tensile strength at yield is measured according to ASTM D638, with a crosshead speed of 50.8 mm/min, and a gauge length of 50.8 mm, using an Instron machine. The elongation at yield is also measured according to ASTM D638.

Flexural Modulus:

The flexural modulus is obtained according to ASTM D790A, with a crosshead speed of 1.27 mm/min (0.05 in/min), and a support span of 50.8 mm, using an Instron machine.

Gardner Impact Strength and Failure Mode:

The Gardner impact strength was measured according ASTM D3029, Method G, Procedure GC, at −29° C. and on 90 mm diameter and 3.175 mm thickness disks. The failure mode is classified as shatter, brittle, and or ductile, based on the nature of the failure type. For example, in shatter failure mode, the sample under test fractures into multiple pieces (often the number pieces can be 10–15) on impact by the falling weight. In brittle failure, many radial cracks develop from around the impact point, but the radial cracks do not propagate all the way to the outer periphery of the sample, and the pieces are held together. In ductile failure mode, only the sample portion that is impacted pushes out in an unsymmetrical manner, with a crack on one side, but rough and fibrillar surface is visible on the crack surface. The failure modes of shatter-to-brittle, brittle-to-ductile, or a combination of the two different types of failure modes in the sample. The failure mode of brittle-to-ductile which is in-between shatter and ductile, where the impacted part shows radial cracks around the area of impact, even though the piece is still intact. Even though the failure modes described above are based on human judgment, rather than a quantitative number from an instrumental evaluation, the failure modes are very reproducible. An individual trained in the field can classify different materials using the Gardner impact test procedure very accurately.

Notched and Un-notched Izod Impact Strength:

The room temperature and −30° C. notched izod impact strength is measured according to ASTM D256 test method. The impact strength equipment is made by Empire Technologies Inc.

EXAMPLES

The thermoplastic olefin compounds of embodiments of the invention were formulated either in a 30-mm ZSK twin screw extruder. Compounding in the twin screw extruder was accomplished using an intense mixing screw element. The batch size was 5000 gm. The temperature profile in the various extruder zones was ramped progressively from 170° C. to 210° C. The compounds discharged from the extruder were pelletized.

Standard test specimens conforming to ASTM specifications were prepared through injection molding on a 300-ton Van Dorn press. The nozzle, front and rear temperatures of the injection molding equipment were maintained at 190° C. The mold temperature was kept constant at 27° C. The total cycle time was 54 seconds and the injection pressure was 4 MPa. A family mold containing various ASTM specimen cavities was used.

Physical properties of the various samples are measured as described in Table 1.

TABLE 1

STANDARD TEST METHODS

| TEST | METHOD |
|---|---|
| Notched Izod Impact (J/m) ft-lb./inch Room Temperature −30° C. | ASTM D 256 |
| 1% Secant Modulus (MPa) psi Tangent Modulus (MPa) psi | ASTM D 790 A |
| Tensile Strength @ yield (MPa) psi Young's Modulus (MPa) psi Elongation @ yield/brk. (%) | ASTM D 638 |
| Melt Flow Rate (gm/10 min) | ASTM D 1238, Condition L (230° C.) Condition E (190° C.) |
| Gardner Impact @ −29° C. (dN · m) | ASTM D 5420 Geometry GC |
| Rockwell Hardness | ASTM D 785 |
| Heat Distortion Temperature (HDT) @ (.45 MPa load) | ASTM D 648 |
| Instrumented Impact | ExxonMobil Method (below) |
| Crystalline Melting Point (abbreviated Tm) | Differential Scanning Calorimetry (DSC). |

TABLE 1-continued

STANDARD TEST METHODS

| TEST | METHOD |
| --- | --- |
| | Heating and cooling rates were 10° C./minute. Tm is the temperature at which a maximum occurs in the heat absorption curve. |
| Glass Transition temperature (Tg) | DSC, ASTM E-1356, at a heating rate of 5° C./minute) |
| Density g/cm$^3$ | ASTM D-792 |

The ExxonMobil Test method is described in T. C. Yu "Impact Modification of Polypropylenes with Exact Plastomers", Soc. of Plastics Engineers, ANTEC, May 1994.

For this test method, high-speed puncture testing based on ASTM D-3763 was used to study impact behavior. This test continuously measures the applied force and time during the impact event. The electronically collected data points are next processed through a computer to provide graphic representation of both force and energy as a function of displacement.

A drop-weight tester, Ceast Fractovis, was used to gather the data in Table 3. It consists of three main parts: clamp assembly, plunger assembly, and IBM PC based control unit. Two parallel rigid plates with a large opening to expose the test specimen form the clamp assembly. Both the top and bottom plates are of the same dimension. The plunger assembly consists of a steel rod with a removable hemispherical tip to hold the measuring strain gauge. It is located perpendicular to and centered on the clamp hole. A control unit regulates the plunger test speed, as well as records the load and displacement data. Similar to the conventional notched Izod testing, the test geometries need to be carefully defined because they are not precisely specified in the ASTM procedure. A 20 mm diameter hemispherical striker and a 40 mm opening clamp were used for this study. The test speed was set at 4 m/sec. For sub-ambient temperature testing, test specimens were chilled in a freezer for four hours at the test temperature. They were then stored in a liquid nitrogen cooled test chamber underneath the clamp assembly for further conditioning before testing.

A force-displacement graph may be generated for a ductile material. Integration of the force displacement curve, in turn, yields an energy-displacement curve. This energy is reported in Table 3. Initially, a ductile material may behave as elastic solid in that deformation is proportional to the displacement. The initial slope of the generated graph is therefore a measure of the sample stiffness. After the elastic region, the sample starts to yield to the advancing plunger. At the yield point, the sample exerts its maximum resistance, the yield point is therefore the highest point on the force-displacement curve. Afterwards, the high speed plunger initiates a crack in the sample and starts its downward penetration of the test specimen. The sample then starts to draw to accommodate the advancing plunger. Finally the plunger punctures through the test specimen; and, lastly, a small amount of energy is needed to overcome the friction between the test plunger and the plastic sample. Because of the large extent of this sample drawing, the total energy is approximately twice the yield energy. A ductility index (DI) can be defined as:

$DI=[(\text{Total Energy}-\text{Yield Energy})/\text{Yield Energy}]\times 100$

The polypropylene resins selected for this study were impact copolymers, with melt flow rate in range of 20 to 35 dg/min. and total ethylene content in the polymer nominally in the range of 6 to 12 wt % and the ethylene in the EP rubber phase was from 45 to 55 wt %. These are commercially available under the trade name Escorene®PP grades from ExxonMobil Chemical.

The very low density polyethylene (VLDPE) modifiers were copolymers of ethylene and hexene with density of 0.912 g/cm3 and melt index varying from 3.5 to 12.5 dg/min. These are commercially available under the trade name Exceed® (abbreviated as ECD) from ExxonMobil Chemical.

The compatibilizer component (labeled PC in Table 2) was a propylene ethylene copolymer with an ethylene content of 13 wt %. This polymer has a Mooney Viscosity of 21.

TABLE 2

POLYMER CHARACTERISTICS

| | | PP 7715 E4 | PP 7414 | ECD 411 | ECD 330 | PC |
| --- | --- | --- | --- | --- | --- | --- |
| Melt Flow Rate @ 230° C. | gm/10 min | 35 | 20 | — | — | — |
| Melt Index @ 190° C. | gm/10 min | — | — | 3.5 | 12.5 | — |
| Mooney Viscosity (1 + 4) 125° C. | MU | — | — | — | — | 21 |
| Density | gm/cc | 0.9 | 0.9 | 0.912 | 0.912 | — |
| Comonomer Type | | PP Impact Copolymer | | C6 | C6 | C2 |
| Comonomer Content | Wt. % | | | | | |

Table 3 shows thermoplastic olefin compounds containing a polymer compatibilizer in addition to the VLDPE impact modifier. The polymer modifier was ECD 411 (3.5 MI) that is dispersed in a 35 MFR PP impact copolymer matrix. With the addition of the compatibilizer component (Examples 2 and 3) at low concentrations of 2% and 5% respectively, there was substantial improvement in room temperature (21° C.) notched izod impact (RTNI) and notched izod at low temperature (−30° C.) toughness. Comparing Example 1 with 3, notched izod impact improves from 97 J/m to no break. Failure mode at low temperature (−30° C.) for the compounds containing the polymer compatibilizer was predominantly ductile. Examples 4 through 6 illustrate the effect of polymer compatibilizer (PC) at a higher polyethylene concentration of 20 wt %. The addition of PC substantially improves toughness. Additional comparative examples 7 to 9 contain formulations with 23 wt % polyethylene modifier content, demonstrating that at 23 wt % polyethylene, both room temperature (21° C.) toughness and low temperature (−30° C.) ductility was realized in the formulation (Example 7). The PC addition (Examples 8 and 9) has little significant effect, since the formulations without the compatibilizer have good toughness. For completeness we have included in Table 3, a comparative example, example 10, from U.S. Pat. No. 6,245,856, showing that similar physical properties can be achieved with lower over all density of the modifier component.

Although the present invention has been described in considerable detail with reference to certain aspects and embodiments thereof, other aspects and embodiments are possible. For example, while hetero phase polymer compositions have been exemplified, containing a polypropylene component, an impact modifying component and a compatibilizing component, other components and combinations are also contemplated. Therefore, the spirit and scope of the appended claims should not be limited to the description of the versions contained herein.

Certain features of the present invention are described in terms of a set of numerical upper limits and a set of numerical lower limits. It should be appreciated that ranges from any lower limit to any upper limit are within the scope of the invention unless otherwise indicated.

All patents, test procedures, and other documents cited in this application are fully incorporated by reference to the extent such disclosure is not inconsistent with this application and for all jurisdictions in which such incorporation is permitted.

TABLE 3

| Example | 1 | 2 | 3 | 4 | 5 | 6 | 7 | 8 | 9 | Ex 10 U.S. Pat. No. 6245856 |
|---|---|---|---|---|---|---|---|---|---|---|
| PP 7715 E4 (polypropylene component) | 83 | 81 | 78 | 80 | 78 | 75 | 77 | 75 | 72 | 70* |
| ECD 411 (modifier component) | 17 | 17 | 17 | 20 | 20 | 20 | 23 | 23 | 23 | 20* |
| compatibilizer comp. | 0 | 2 | 5 | 0 | 2 | 5 | 0 | 2 | 5 | 10* |
| Notched Izod Impact @ ° C. (J/m) | | | | | | | | | | |
| 21.0 | 97.7 | 159.1 | NB | 121.2 | NB | NB | NB | NB | NB | 524 |
| −30.0 | 40.6 | 44.9 | 44.3 | 41.0 | 44.5 | 46.7 | 47.2 | 55.5 | 57.1 | 70 |
| Instrumented Impact/ −30° C./24 km/h | | | | | | | | | | |
| Total Energy (J) | 7.7 | 8.2 | 7.9 | 8.0 | 8.0 | 8.2 | 7.7 | 7.9 | 7.9 | |
| Failure Type | 4D, 1DB | 5D | 5D | 5D | 5D | 5D | 5D | 5D | 5D | |
| Instrumented Impact/ −40° C./24 mph | | | | | | | | | | |
| Total Energy (J) | 4.4 | 3.5 | 3.6 | 5.1 | 4.8 | 6.0 | 6.9 | 6.6 | 6.5 | |
| Failure Type | 4BD, 1DB | 5BD | 5BD | 5BD, 2DB, 1D | 5DB, 3BD | 1D, 2DB, 2BD | 3D, 2DB | 2D, 2DB, 1BD | 2D, 1DB, 2BD | |
| Flexural Modulus (MPa) @ 1.3 mm/min | | | | | | | | | | |
| 1% Secant | 1193 | 1069 | 952 | 1097 | 1021 | 834 | 993 | 924 | 821 | 779 |
| Tangent | 1214 | 1110 | 1007 | 1214 | 1076 | 841 | 1028 | 979 | 883 | 814 |
| Tensile Strength @ 51 mm/min | | | | | | | | | | |
| @ Yield (MPa) | 23.7 | 22.1 | 21.8 | 23.6 | 22.8 | 21.4 | 21.4 | 21.9 | 20.6 | 7.3 |
| Young's Modulus (MPa) | 1365 | 1177 | 1164 | 1388 | 1298 | 1080 | 1275 | 1165 | | 6.5 |
| Elongation (%) @ 51 mm/min | | | | | | | | | | |
| Yield | 7 | 9.1 | 11.5 | 8.1 | 10 | 13.3 | 10.5 | 12 | 14.8 | 18 |
| Break | 60 | 139 | 680 | 121 | 352 | 694 | 511 | 672 | 68.1 | 966 |
| MFR (g/10min) | 26.7 | 24.4 | 20.5 | 26.1 | 24.3 | 21.6 | 25 | 22.2 | 20.8 | 224.1 |

NB = No Break;
D = Ductile,
B = Brittle,
BD = Brittle Ductile,
DB = Ductile Brittle

*note that the example from U.S. Pat. No. 6,245,856 which uses for blend components a polypropylene homopolymer as the polypropylene component, an ethylene propylene vinyl norbornene polymer with 57 wt % ethylene, 1.5 wt % VNB and the balance propylene, the compatibilizer is a polymer with a 33 Mooney viscosity and 12.4 wt % ethylene.

We claim:

1. A hetero phase polymeric composition, comprising:
   a) a polypropylene component, present in said hetero phase polymer composition as a continuous phase, said polypropylene component having a melting point, $Tm \geq 110°$ C.;
   b) a modifier component, said modifier component being a dispersed phase in said hetero phase polymer composition, said modifier component including at least 10 percent by weight of the total modifier component being an ethylene α-olefin polymer having a density $\geq 0.905$ g/cm$^3$, and said modifier component having from 0 to 10% propylene crystallinity;
   c) a compatibilizer component, present in said hetero phase polymer composition in a compatibilizing amount, said compatibilizer component having a $\Delta Hf<45$ J/g, said compatibilizer component having propylene sequences co-crystallizable with the polypropylene component of a).

2. The hetero phase polymer composition of claim 1, wherein said polypropylene component is an impact copolymer (ICP) of propylene and an α-olefin, said ICP having one or more of a $Tm>115°$ C., a $\Delta Hf>60$ J/g, or a total α-olefin content of <70 weight percent; said α-olefin being one of ethylene, butene-1,4 methyl-1-pentene, hexene-1, octene-1, decene-1, ondecene-1, dodecene-1 or combinations there of; and wherein said polypropylene component is one of isotactic, syndiotactic, atactic, or combinations thereof.

3. The hetero phase polymer composition claim 2, wherein said polypropylene component has one or more of a $Tm>125°$ C., a $\Delta Hf$ of >80 J/g, or an α-olefin content of >2 wt. % or <50 wt. %, based on the total weight of said polypropylene component, and wherein said α-olefin being one or more of ethylene, butene-1,4 methyl-1-pentene, hexene-1, octene-1.

4. The hetero phase polymer composition claim 3, wherein said polypropylene component has one or more of a $Tm>130°$ C., a $\Delta Hf$ of >85 J/g; or an α-olefin content of >2 wt. % or <40 wt. %, based on the total weight of said polypropylene component, and wherein said α-olefin being one or more of ethylene, butene-1, hexene-1, octene-1.

5. The hetero phase polymer composition of claim 4, wherein said polypropylene component has one or more of a $Tm>135°$ C., a $\Delta Hf$ of >90 J/g; or an α-olefin content of >2 wt. % or <30 wt. %, based on the total weight of said, and wherein said α-olefin is ethylene.

6. The hetero phase polymer composition of claim 5, wherein said polypropylene component has one or more of a $Tm>140°$ C., a $\Delta Hf$ of >95 J/g; or an α-olefin content of >2 wt. % or <25 wt. %, based on the total weight of said polypropylene component, said polypropylene component having a molecular weight in the range of from 10,000 to 5,000,000, said polypropylene component having a melt flow rate (MFR), in the range of 15–60 g/10 mm; said ICP including a homopolymer polypropylene and rubber, said rubber being present in said ICP in the range of from 4–20 wt. %, based on the total weight of said ICP, said rubber having an α-olefin content of 25–70 weight %.

7. The hetero phase polymer composition of claim 6, wherein said modifier component is a single polymer or a blend of two or more ethylene α-olefin polymers, said α-olefin being one of propylene, butene-1,4-methyl-1-pentene, hexene-1, octene-1, decene-1, ondecene-1, dodecene-1 or combinations thereof, said α-olefin or α-olefins present in said ethylene α-olefin polymer or polymers <20 mole %, in each if two or more are present, said modifier component being substantially devoid of propylene crystallinity.

8. The hetero phase polymer composition of claim 7, wherein said compatibilizer component and said polypropylene component have substantially the same stereoregularity, chosen from one of isotactic, syndiotactic, atactic, or combinations there of; said compatibilizer component being a propylene α-olefin polymer having one or more α-olefin comonomers present in said compatibilizer component, said α-olefins selected from one or more of ethylene or an α-olefin having 4–12 carbon atoms.

9. The hetero phase polymer composition of claim 8, wherein said compatibilizer component has a crystallizable portion and an amorphous portion, said amorphous portion being the result of one of stereo error introduced by a catalyst or by the amount and nature of a comonomer.

10. The hetero phase polymer composition of claim 9, wherein said compatibilizer component is a polymer of propylene and one or more of ethylene, butene-1,4-methyl-1-pentene, hexene-1, octene-1, and decene-1.

11. The hetero phase polymer composition of claim 10, wherein said compatibilizer component is a polymer of propylene and one or more of ethylene, butene-1, hexene-1, or octene-1; wherein said compatibilizer component has a crystallinity defined by a melting point $(Tm)<105°$ C., and/or a $\Delta Hf<35$ J/g, and/or a Mooney viscosity ML (1+4) @125° C.<100, said compatibilizer component has a narrow compositional distribution, such that >75 wt. % of the compatibilizer component may be isolated in a thermal fractionation, in 2 adjacent soluble fractions, where each fraction differs <20% from the average weight present α-olefin of the total compatibilizer component; wherein said polypropylene component is present in said hetero phase polymer composition in the range of from 70–90 wt. %; said modifier component is present in said hetero phase polymer composition in the range of from 10–25 wt. %; and said compatibilizer component being present in said hetero phase polymer composition in the range of from 0.1–8 wt. %; said weight percents of a), b) and c), being based on the total polymer weight of said hetero phase polymer composition.

12. The hetero phase polymer composition of claim 11, wherein said compatibilizer component has a crystallinity defined by a melting point $(Tm)<100°$ C., and/or a $\Delta Hf<25$ J/g, and/or a Mooney viscosity ML (1+4)@125° C.<75; wherein said polypropylene component is present in said hetero phase polymer composition in the range of from 80–90 wt. %; said modifier component is present in said hetero phase polymer composition in the range of from 15–22 wt. %; and said compatibilizer component being present in said hetero phase polymer composition in the range of from 0.1–5 wt. %; said weight percents of a), b) and c), being based on the total polymer weight of said hetero phase polymer composition.

13. A process for preparing a hetero phase polymer composition of claim 12, comprising:
   mixing the components a) b) and c), melt mixing said a) b) and c) at a high intensity for a time to form said hetero phase composition.

14. A two phase polymer blend comprising:
   a) a polypropylene component present as a continuous phase, said polypropylene component having a $Tm>110°$ C. or a $\Delta Hf>60$ J/g, and wherein said polypropylene component has crystallinity from one of isotactic or syndiotactic sequences;
   b) a modifier component, present in said polymer blend at $\leq 10$ weight percent, based on the total polymer weight of said blend, said modifier component having a density in the range of from 0.85–0.965 g/cm$^3$ and being substantially free of propylene crystallinity; and c) a compatibilizer component, present in said blend at a compatibilizing amount, said compatibilizer component having a ΔHf<45 J/g, said compatibilizer component having propylene sequences that co-crystallize with the polypropylene component of a).

15. The two phase polymer blend of claim 14, wherein said modifier component is present in said blend at ≦9.5 weight percent, and a melt index in the range of from 0.1–10 g/10 minutes, 190° C., said modifier component being an ethylene α-olefin polymer including ethylene and an α-olefin selected from an α-olefin having 3–12 carbon atoms.

16. The two phase polymer blend of claim 15, wherein said modifier component is present in said blend at ≦9.0 weight percent, and wherein said α-olefin is selected from one or more of propylene, butene-1,4-methyl-1-pentene, hexene-1, octene-1, decene-1, ondecene-1, dodecene-1 or combinations thereof.

17. The two phase polymer blend of claim 16, wherein said α-olefin is selected from one or more of butene-1, hexene-1, or octene-1, said α-olefin being present in said ethylene α-olefin polymer at <20 mole percent.

18. The two phase polymer blend of claim 17, wherein said modifier component is a blend of two or more ethylene α-olefin polymers, with the proviso that if more than one polymer makes up the modifier component, α-olefin selected and amount contained may be the same or different in each, as well as the same or different densities.

19. The two phase polymer blend of claim 18, wherein said polypropylene component has a Tm>110° C. or a ΔHf>60 J/g, and a polydispersity index (PDI) in the range of from 1–40, and wherein said modifier component is substantially free of propylene crystallinity.

20. The two phase polymer blend of claim 19, wherein said polypropylene component is an impact copolymer (ICP) of propylene and an α-olefin, said ICP having one or more of a Tm>115° C., a ΔHf>70 J/g, or a total α-olefin content of <70 weight percent; said α-olefin being one of ethylene, butene-1,4 methyl-1-pentene, hexene-1, octene-1, decene-1, ondecene-1, dodecene-1 or combinations there of; and wherein said polypropylene component is one of isotactic, syndiotactic, atactic, or combinations thereof.

21. The two phase polymer blend of claim 20, wherein said polypropylene component has one or more of a Tm>125° C., a ΔHf of >80 J/g, or an α-olefin content of >2 wt. % or <50 wt. %, based on the total weight of said polypropylene component, and wherein said α-olefin being one or more of ethylene, butene-1,4 methyl-1-pentene, hexene-1, octene-1.

22. The two phase polymer blend of claim 21, wherein said polypropylene component has one or more of a Tm>130° C., a ΔHf of >85 J/g; or an α-olefin content of >2 wt. % or <40 wt. %, based on the total weight of said polypropylene component; and wherein said α-olefin being one or more of ethylene, butene-1, hexene-1, octene-1.

23. The two phase polymer blend of claim 22, wherein said polypropylene component has one or more of a Tm>135° C., a ΔHf of >90 J/g; or an α-olefin content of >2 wt. % or <30 wt. %, based on the total weight of said, and wherein said α-olefin is ethylene.

24. The two phase polymer blend of claim 23 wherein said polypropylene component has one or more of a Tm>140° C., a ΔHf of >95 J/g; or an α-olefin content of >2 wt. % or <25 wt. %, based on the total weight of said polypropylene component, said polypropylene component having a molecular weight in the range of from 10,000 to 5,000,000, said polypropylene component having a melt flow rate (MFR), in the range of from 15–60 g/10 mm; said ICP including a homopolymer polypropylene and rubber, said rubber being present in said ICP in the range of from 4–20 wt. %, based on the total weight of said ICP, said rubber having an α-olefin content of 25–70 weight %, said ICP having a PDI in the range of from 1–40.

25. The two phase polymer blend of claim 24, wherein said compatibilizer component and said polypropylene component have substantially the same stereoregularity, chosen from one of isotactic, syndiotactic, atactic, or combinations thereof; said compatibilizer component being a propylene polymer having one or more α-olefin comonomers present in said compatibilizer component, said α-olefins selected from one or more of ethylene or an α-olefin having 4–12 carbon atoms.

26. The two phase polymer blend of claim 25, wherein said compatibilizer component has a crystallizable portion and an amorphous portion, said amorphous portion being the result of one of stereo error introduced by a catalyst or by the amount and nature of a comonomer.

27. The two phase polymer blend of claim 26, wherein said compatibilizer component is a polymer of propylene and one or more of ethylene, butene-1,4-methyl-1-pentene, hexene-1, octene-1, and decene-1.

28. The two phase polymer blend of claim 27, wherein said compatibilizer component said compatibilizer component is a polymer of propylene and one or more of ethylene, butene-1, hexene-1, or octene-1; wherein said compatibilizer component has a crystallinity defined by a melting point (Tm)<105° C., and/or a ΔHf<35 J/g, and/or a Mooney viscosity ML (1+4)@125° C.<100, said compatibilizer component has a narrow compositional distribution, such that >75 wt. % of the compatibilizer component may be isolated in a thermal fractionation, in 2 adjacent soluble fractions, where each fraction differs <20% from the average weight present α-olefin of the total compatibilizer component; wherein said polypropylene component is present in said hetero phase polymer composition in the range of from 70–90 wt. %; said modifier component is present in said hetero phase polymer composition in the range of from 15–25 wt. %; and said compatibilizer component being present in said hetero phase polymer composition in the range of from 0.1–8 wt. %; said weight percents of a), b) and c), being based on the total polymer weight of said hetero phase polymer composition.

29. The two phase polymer blend of claim 28, wherein said compatibilizer component has a crystallinity defined by a melting point (Tm)<100° C., and a ΔHf<25 J/g, a Mooney viscosity ML (1+4)@125° C.<75; wherein said polypropylene component is present in said hetero phase polymer composition in the range of from 80–90 wt. %; said modifier component is present in said hetero phase polymer composition in the range of from 15–20 wt. %; and said compatibilizer component being present in said hetero phase polymer composition in the range of from 0.1–5 wt. %; said weight percents of a), b) and c), being based on the total polymer weight of said hetero phase polymer composition.

30. A two phase polymer composition, comprising:
a) an impact copolymer of propylene (ICP), said ICP having one or more of Tm>140° C., ΔHf>95 J/g, or an α-olefin content of one of >2 or <25 weight percent, a molecular weight in the range of from 10,000–5,000, 000, a melt flow rate in the range of from 15–60 dg/min., said ICP present in said two phase polymer composition in the range of from 70–90 weight percent;
b) an ethylene α-olefin copolymer, wherein said α-olefin is one or more of butene-1, hexene-1, or octene-1, said ethylene copolymer having a density ≧0.905 g/cm³, said ethylene copolymer may be a blend of two or more ethylene α-olefin copolymers, and if a blend, the aggregate density is $\geq 0.905$ g/cm$^3$, said ethylene α-olefin copolymer being present in said two phase polymer composition in the range of from 15–22 weight percent, having an melt index in the range of from 0.1–10 g/10 minutes, and wherein said ethylene α-olefin copolymer has from 0 to 10% propylene crystallinity;

c) a compatibilizer component present in said two phase polymer composition in the range of 0.1–8 weight percent, said compatibilizer component is a polymer of propylene and one or more of ethylene, butene-1, hexene-1, or octene-1, said compatibilizer component has a crystallinity defined by one of Tm<100° C., or a ΔHf<25 J/g, wherein said compatibilizer component has a narrow compositional distribution, such that >75 wt. % of the compatibilizer component may be isolated in a thermal fractionation, in 2 adjacent soluble fractions, where each fraction differs <20% from the average weight present α-olefin of the total compatibilizer component.

31. A hetero phase polymeric composition, comprising:
a) a polypropylene component present in said hetero phase polymer composition as a continuous phase, said polypropylene component having a melting point Tm$\geq$100° C.;

b) a modifier component, said modifier component being a dispersed phase in said hetero phase polymer composition, and comprising at least 10 % by weight of the total modifier component of an polymer derived from ethylene and an alpha-olefin having from 4 to 20 carbon atoms with a density of at least 0.88 g/cm$^3$ and a CDBI of at least 50 %, said modifier component having from 0 to 10% propylene crystallinity;

c) a compatibilizing amount of a compatibilizer component, derived to an extent of at least 50 mole % of propylene compatibilizer component and having a ΔHf<45 J/g which is co-crystallizable with the polypropylene component.

32. The hetero phase polymeric composition of claim 31, wherein said ethylene α-olefin polymer component is substantially free of propylene crystallinity.

33. The two phase polymer composition of claim 30, wherein said ethylene α-olefin copolymer is substantially free of propylene crystallinity.

34. The hetero phase polymeric composition of claim 1, wherein said ethylene α-olefin polymer is substantially free of propylene crystallinity.

* * * * *